US012038813B2

(12) United States Patent
Araya et al.

(10) Patent No.: US 12,038,813 B2
(45) Date of Patent: Jul. 16, 2024

(54) TRANSMITTING SIDE TRANSMISSION DEVICE, RECEIVING SIDE TRANSMISSION DEVICE, REDUNDANCY METHOD OF TRANSMITTING SIDE TRANSMISSION DEVICE, REDUNDANCY METHOD OF RECEIVING SIDE TRANSMISSION DEVICE, PROGRAM, AND TRANSMISSION DEVICE

(71) Applicant: Nippon Telegraph and Telephone Corporation, Tokyo (JP)

(72) Inventors: Katsuhiro Araya, Musashino (JP);
Hiroto Takechi, Musashino (JP);
Yasutaka Sugano, Musashino (JP);
Masahiro Yokota, Musashino (JP);
Hideki Maeda, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 18/015,857

(22) PCT Filed: Jul. 13, 2020

(86) PCT No.: PCT/JP2020/027249
§ 371 (c)(1),
(2) Date: Jan. 12, 2023

(87) PCT Pub. No.: WO2022/013916
PCT Pub. Date: Jan. 20, 2022

(65) Prior Publication Data
US 2023/0297476 A1    Sep. 21, 2023

(51) Int. Cl.
*G06F 11/14* (2006.01)
*H04L 1/22* (2006.01)

(52) U.S. Cl.
CPC ............ *G06F 11/1443* (2013.01); *H04L 1/22* (2013.01)

(58) Field of Classification Search
CPC ..... G06F 11/1443; G06F 11/1423; H04L 1/22
(Continued)

(56) References Cited

U.S. PATENT DOCUMENTS

2003/0065974 A1* 4/2003 Lam ................. H04L 45/24
714/11
2009/0067323 A1* 3/2009 Matsushima ....... H04L 41/0677
370/225

(Continued)

FOREIGN PATENT DOCUMENTS

JP    2009017508    1/2009

OTHER PUBLICATIONS

The Telecommunication Technology Committee, "Ethernet Linear Protection Switching," TTC standard JT-G8031, 1st Edition, May 31, 2011, retrievd from URL <https://www.ttc.or.jp/application/files/9015/5425/7356/JT-G8031v1.pdf>, 155 pages (with English Translation).

*Primary Examiner* — James C Kerveros
(74) *Attorney, Agent, or Firm* — Fish & Richardson P.C.

(57) ABSTRACT

A transmission side transmission device includes a first transmitter including a first switch and a second transmitter including a second switch. When the first transmitter detects a fault in the first main signal, the second transmitter outputs a duplicated signal of the second main signal to the first transmitter. The first selector of the first transmitter selects and outputs a duplicated signal of the input second main signal. When the second transmitter detects a fault in the first switch, the second transmitter selects and outputs the second main signal.

4 Claims, 14 Drawing Sheets

(58) Field of Classification Search
USPC .......................................................... 714/748
See application file for complete search history.

(56) References Cited

U.S. PATENT DOCUMENTS

| | | | |
|---|---|---|---|
| 2010/0165892 A1* | 7/2010 | Cha | H04W 24/00 370/280 |
| 2012/0005543 A1* | 1/2012 | Chenu | H04L 1/22 714/49 |
| 2012/0246339 A1* | 9/2012 | Huang | H04L 49/557 709/239 |
| 2012/0275297 A1 | 11/2012 | Subramanian | |
| 2016/0134467 A1* | 5/2016 | Miao | H04L 41/0654 370/220 |
| 2020/0280750 A1* | 9/2020 | Nakamura | H04L 65/764 |
| 2021/0160017 A1* | 5/2021 | Tanaka | H04L 1/0007 |

\* cited by examiner

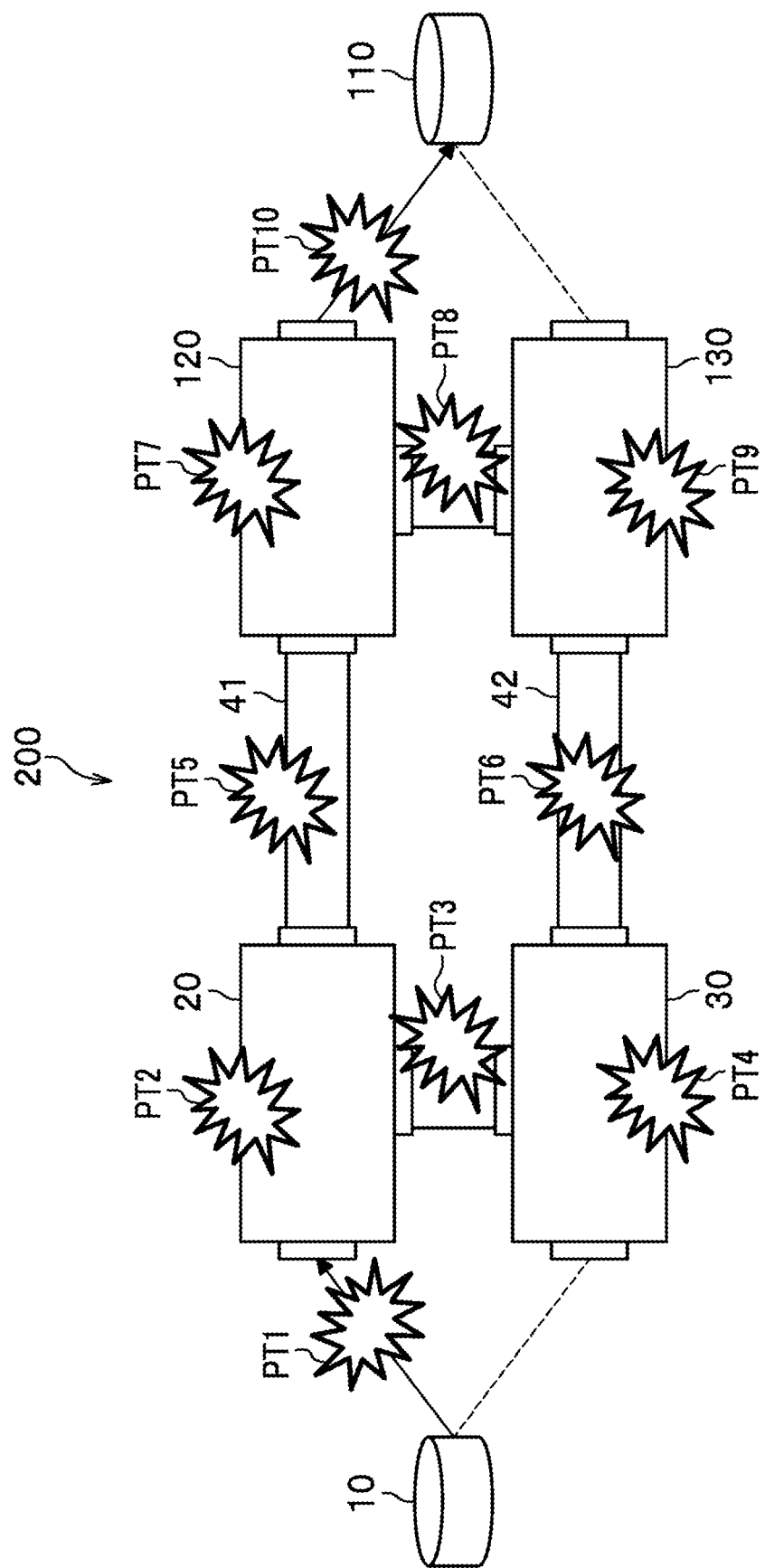

Fig. 3

| PATTERN | FAULT PORTION | MAIN SIGNAL ROUTE AFTER SWITCHING | SWITCHING SEQUENCE | NOTE |
|---|---|---|---|---|
| NORMAL TIME | NO | ROUTER 10→TRANSMITTER 20→RECEIVER 120→ROUTER 110 | — | |
| PT1 | SECTION BETWEEN ROUTER 10/TRANSMITTER 20 | ROUTER 10→TRANSMITTER 20→TRANSMITTER 30→RECEIVER 120→ROUTER 110 | EXAMPLE 1 | |
| PT2 | TRANSMITTER 20 DEVICE | ROUTER 10→TRANSMITTER 30→RECEIVER 130→ROUTER 110 | EXAMPLE 2 | |
| PT3 | SECTION BETWEEN TRANSMITTER 20/TRANSMITTER 30 | ROUTER 10→TRANSMITTER 20→RECEIVER 120→ROUTER 110 | NO | NO ROUTE CHANGE |
| PT4 | TRANSMITTER 30 DEVICE | ROUTER 10→TRANSMITTER 20→RECEIVER 120→ROUTER 110 | NO | NO ROUTE CHANGE |
| PT5 | SECTION BETWEEN TRANSMITTER 20/RECEIVER 120 | ROUTER 10→TRANSMITTER 20→TRANSMITTER 30→RECEIVER 130→ROUTER 110 | EXAMPLE 3 | |
| PT6 | SECTION BETWEEN TRANSMITTER 30/RECEIVER 130 | ROUTER 10→TRANSMITTER 20→RECEIVER 120→ROUTER 110 | NO | NO ROUTE CHANGE |
| PT7 | RECEIVER 120 DEVICE | ROUTER 10→TRANSMITTER 20→TRANSMITTER 30→RECEIVER 130→ROUTER 110 | EXAMPLE 4 | |
| PT8 | SECTION BETWEEN RECEIVER 120/RECEIVER 130 | ROUTER 10→TRANSMITTER 20→RECEIVER 120→ROUTER 110 | NO | NO ROUTE CHANGE |
| PT9 | RECEIVER 130 DEVICE | ROUTER 10→TRANSMITTER 20→RECEIVER 120→ROUTER 110 | NO | NO ROUTE CHANGE |
| PT10 | SECTION BETWEEN RECEIVER 130/ROUTER 110 | ROUTER 10→TRANSMITTER 20→RECEIVER 120→ROUTER 110 | — | |

TRANSMITTING SIDE TRANSMISSION DEVICE, RECEIVING SIDE TRANSMISSION DEVICE, REDUNDANCY METHOD OF TRANSMITTING SIDE TRANSMISSION DEVICE, REDUNDANCY METHOD OF RECEIVING SIDE TRANSMISSION DEVICE, PROGRAM, AND TRANSMISSION DEVICE

CROSS-REFERENCE TO RELATED APPLICATIONS

This application is a National Stage application under 35 U.S.C. § 371 of International Application No. PCT/JP2020/027249, having an International Filing Date of Jul. 13, 2020.

The disclosure of the prior application is considered part of the disclosure of this application, and is incorporated by reference in its entirety into this application.

TECHNICAL FIELD

The present invention relates to a transmission side transmission device, a reception side transmission device, a redundancy method for the transmission side transmission device, a redundancy method for the reception side transmission device, a program, and a transmission device.

BACKGROUND ART

In the related art, in a system configuration method for an electrical multiplex transmission device in a communication service provider, chassis type configurations in which monitoring control units and switch (SW) units are redundant are generally used. However, with a rapid increase in data center traffic, electrical multiplex transmission devices having space-saving and low-cost box type configurations have recently become widespread in order to meet demands for data center service providers. In the electrical multiplexer transmission device having the box type configuration (hereinafter, referred to as a box type electrical multiplex transmission device), the monitoring control unit and the SW unit are not redundant in order to save space and reduce cost, and reliability at the time of a fault or failure is inferior to that of the chassis type configuration. Therefore, a multi-chassis link-aggregation (MC-LAG) configuration is applied to improve reliability of box type electrical multiplex transmission devices.

In electrical multiplex transmission devices of the related art, a redundant configuration (path protection) in units of logical paths is realized by mapping signals from a client device such as a router or a layer 2 switch to logical paths (for example, an optical transport network (OTN), a virtual local area network (VLAN), multi-protocol label switching (MPLS), or the like) of layer 1 and layer 2, thereby improving reliability against a failure in an electrical multiplex transmission device section (see, for example, Non Patent Literature 1.).

CITATION LIST

Non Patent Literature

Non Patent Literature 1: TTC Standard JT-G8031, "Ethernet Linear Protection Switching", [online], established on May 31, 2011, Information and Communication Technology Committee, [searched on Jul. 1, 2020], Internet <URL:https://www.ttc.or.jp/application/files/9015/5425/7356/JT-G8031v1.pdf>, p. 15-21

SUMMARY OF INVENTION

Technical Problem

In the MC-LAG configuration, implementation of path protection provided in an electrical multiplex transmission device of the related art will be examined. For example, when the current path protection scheme in the MC-LAG configuration is applied, the path protection is required for each of the facing box electrical multiplex transmission devices (two pairs). Therefore, it is necessary to guarantee twice path resources (active and standby) of a relay band, compared with a chassis type electrical multiplex transmission device configuration of the related art.

That is, in order to configure the path protection between the facing box type electrical multiplex transmission devices, it is necessary to guarantee path resources of a relay band for each of an active and a standby. Here, when a traffic distribution method for the MC-LAG is act-standby, in this case, traffic flows only on the active (ACT) side between the box type electrical multiplex transmission devices in this case. Therefore, there is a problem that the path resource guaranteed on the standby (STBY) side may be wasted.

The present invention has been made in view of such circumstances and an objective of the present invention is to effectively utilize path resources of a relay band while guaranteeing redundancy similar to the related art.

Solution to Problem

According to an aspect of the present invention, a transmission side transmission device includes a first transmitter including a first switch; and a second transmitter including a second switch. The first switch of the first transmitter includes a first selector that selects and outputs one of an input first main signal and a duplicated signal of a second main signal input from the second transmitter. The second switch of the second transmitter includes a second selector that selects and outputs one of an input second main signal and a duplicated signal of the first main signal input from the first transmitter. When the first transmitter detects a fault in the input first main signal, The second transmitter duplicates the input second main signal and outputs a duplicated signal of the second main signal to the first transmitter and the first selector of the first transmitter selects and outputs the duplicated signal of the second main signal input from the second transmitter. When the second transmitter detects a fault in the first switch, the second selector of the second transmitter selects and outputs the input second main signal.

Advantageous Effects of Invention

According to the present invention, it is possible to effectively utilize path resources of a relay band while guaranteeing redundancy similar to the related art.

BRIEF DESCRIPTION OF DRAWINGS

FIG. 2 is an explanatory diagram illustrating a fault portion in the transmission device according to the present embodiment.

FIG. 3 is an explanatory diagram illustrating an example of a case where a path of a main signal is switched for each fault pattern.

DESCRIPTION OF EMBODIMENTS

Next, a mode for carrying out the present invention will be described. First, a technology of the related art will be described as a comparative example.

COMPARATIVE EXAMPLE

Figure 10A:
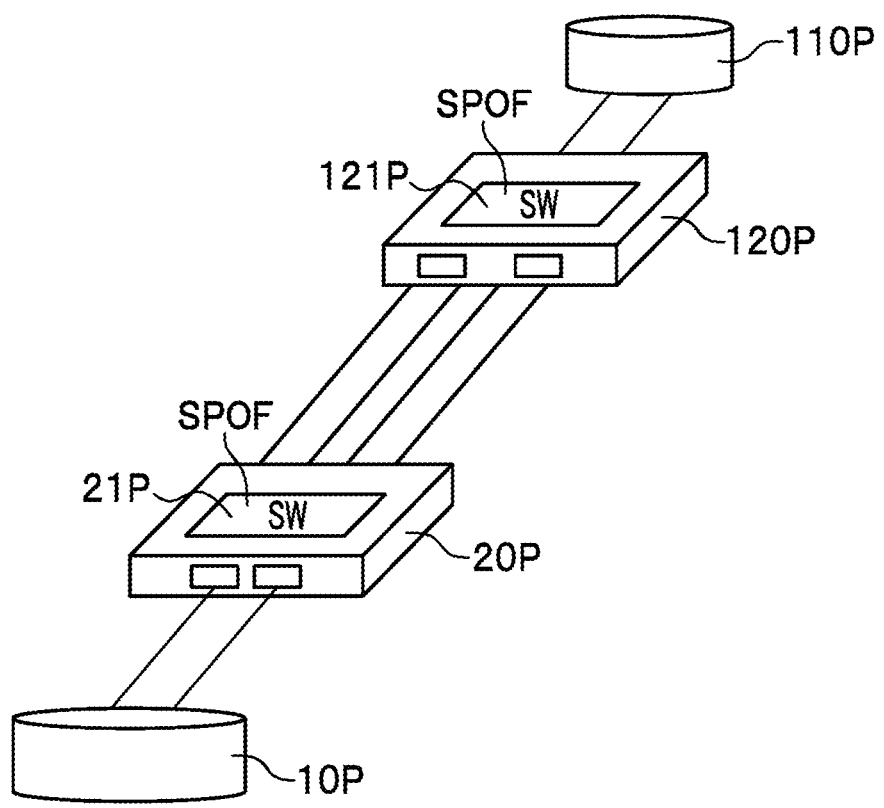
FIG. 10A is an explanatory diagram of an electrical multiplex transmission device that has a configuration of path protection by facing a box type electrical multiplex transmission device of the related art.

FIG. 10A is an explanatory diagram of an electrical multiplex transmission device that has a configuration of path protection by facing a box type switch of the related art (the above-described box type electrical multiplex transmission device).

As illustrated in FIG. 10A, the electrical multiplex transmission device of the related art includes a router 10P, a first transmitter 20P (a box type electrical multiplex transmission device) including a first switch 21P, a first receiver 120P (a box type electrical multiplex transmission device) including a first switch 121P, and a router 110P.

In the electrical multiplex transmission device of the related art, the router 10P is connected to the first transmitter 20P by link aggregation (LAG), and the router 110P is connected to the first receiver 120P by link aggregation. In addition, the first transmitter 20P and the first receiver 120P are connected along two paths to configure path protection.

Here, in the first transmitter 20P and the first receiver 120P, the first switch 21P and the first switch 121P are not redundant. Therefore, for example, when a failure occurs in either the first switch 21P or the first switch 121P, this switch becomes a single point of failure (SPOF). In this case, the whole electrical multiplex transmission device becomes faulty, and the routers 10P and 110P cannot communicate with each other.

Figure 10B:
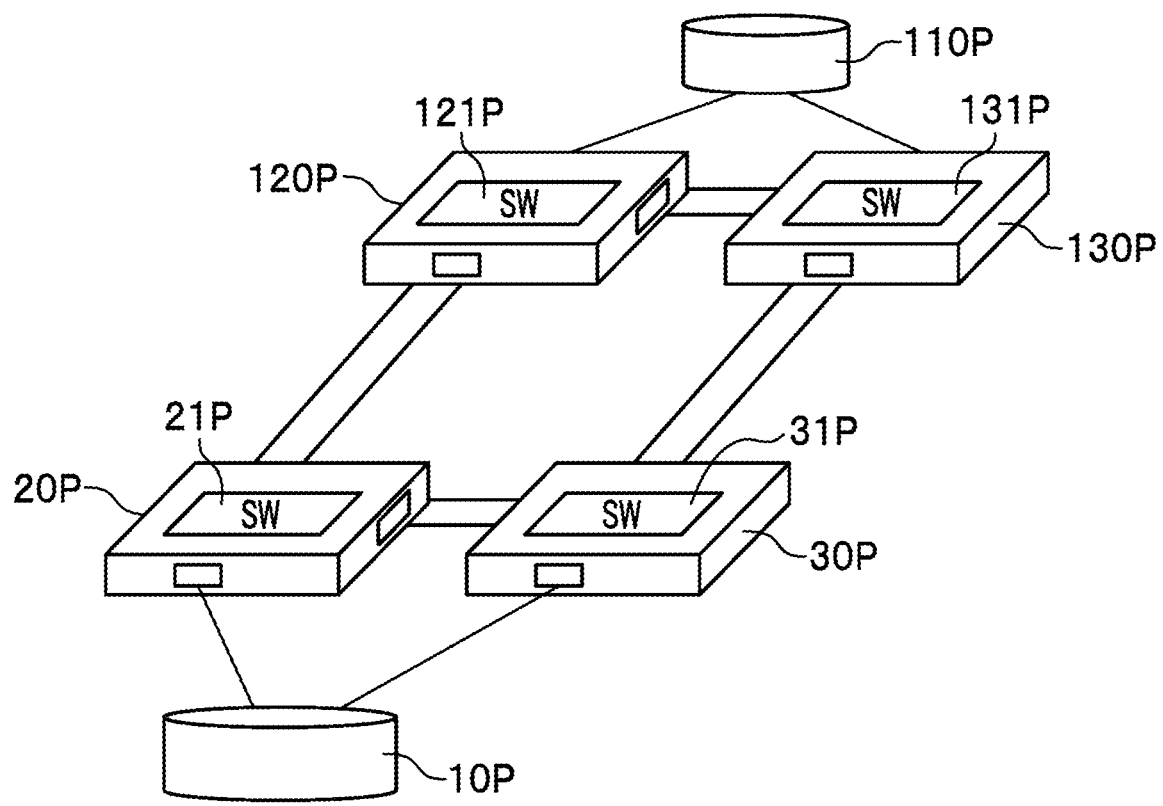
FIG. 10B is an electrical multiplex transmission device in which an MC-LAG configuration is applied to the configuration illustrated in FIG. 10A.

FIG. 10B is an explanatory diagram of an electrical multiplex transmission device in which a multi-chassis (MC)-LAG configuration is applied to the configuration illustrated in FIG. 10A. The same components as those in FIG. 10A are denoted by the same reference numerals, and the description thereof will be omitted as appropriate.

As illustrated in FIG. 10B, the electrical multiplex transmission device adopting the MC-LAG configuration includes the router 10P, the first transmitter 20P, a second transmitter 30P having a second switch 31P, a first receiver 120P, a second receiver 130P having a second switch 131P, and a router 110P.

The first transmitter 20P and the second transmitter 30P are connected to each other and are connected to the router 10P by the MC-LAG. Similarly, the first receiver 120P and the second receiver 130P are connected to each other and are connected to the router 110P by the MC-LAG.

Figure 11A:
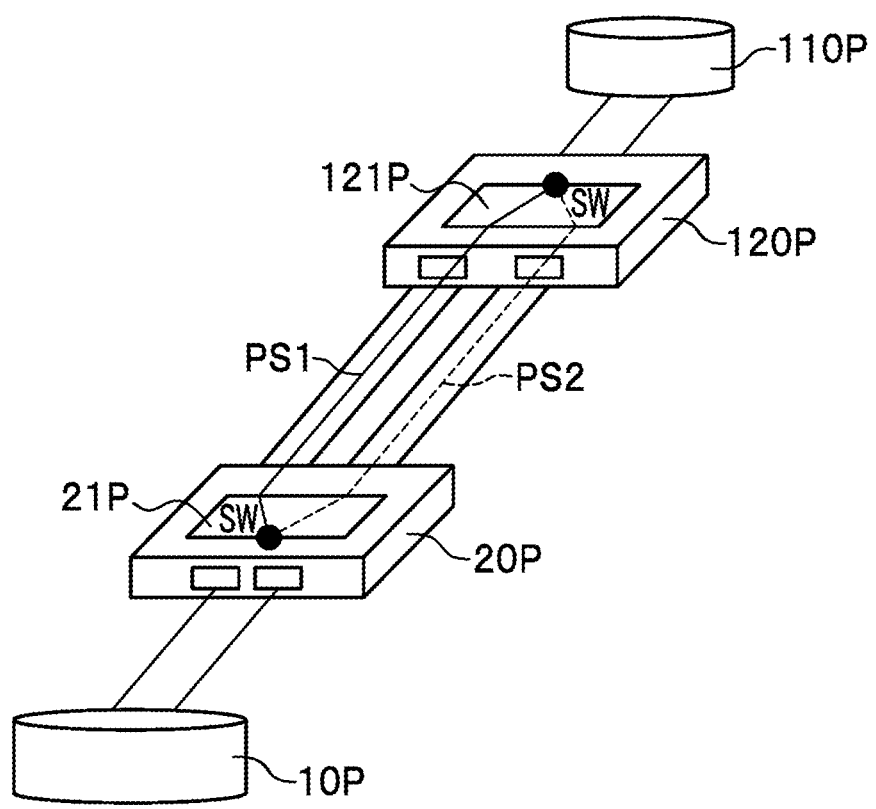
FIG. 11A is an explanatory diagram of an electrical multiplex transmission device in which a current path protection scheme is applied to the configuration illustrated in FIG. 10A.

FIG. 11A is an explanatory diagram of an electrical multiplex transmission device in which the current path protection scheme is applied to the configuration illustrated in FIG. 10A.

In the electrical multiplex transmission device illustrated in FIG. 11A, in the first switch 21P and the first switch 121P, a first path PS1 or a second path PS2 is selected and switched from the first path PS1 and the second path PS2 forming one pair of paths.

Figure 11B:
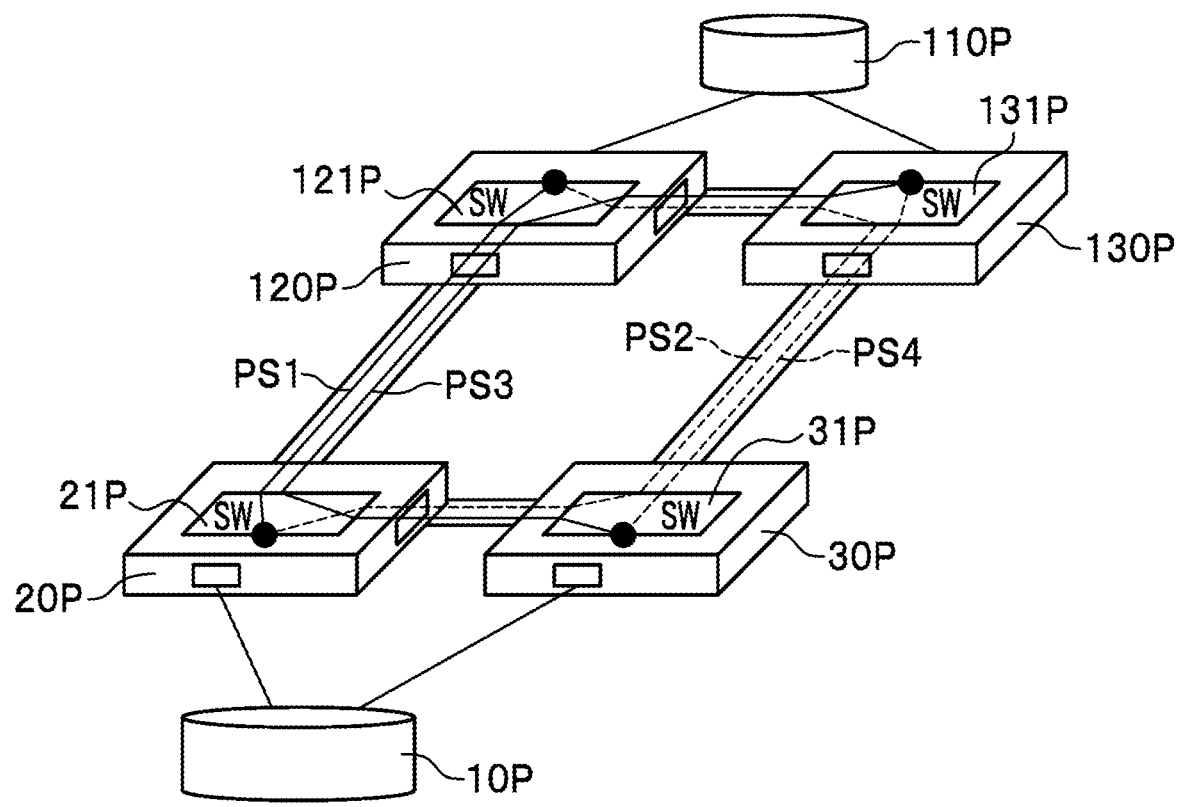
FIG. 11B is an explanatory diagram of the electrical multiplex transmission device in which the MC-LAG configuration is applied to the configuration illustrated in FIG. 11A.

FIG. 11B is an explanatory diagram of the electrical multiplex transmission device in which the MC-LAG configuration is applied to the configuration illustrated in FIG. 11A.

As illustrated in FIG. 11B, the first transmitter 20P and the second transmitter 30P are connected to each other, and the first receiver 120P and the second receiver 130P are connected to each other. In this case, when the current path protection scheme is applied to the electrical multiplex transmission device to which the MC-LAG configuration is applied, two pairs of path protection, that is, a path of the first path PS1 and the second path PS2 and a path of the third path PS3 and the fourth path PS4 are required for each of the facing box type electrical multiplex transmission devices. Therefore, twice the amount of path resources is required compared to path resources of the configuration of the related art.

Figure 12:
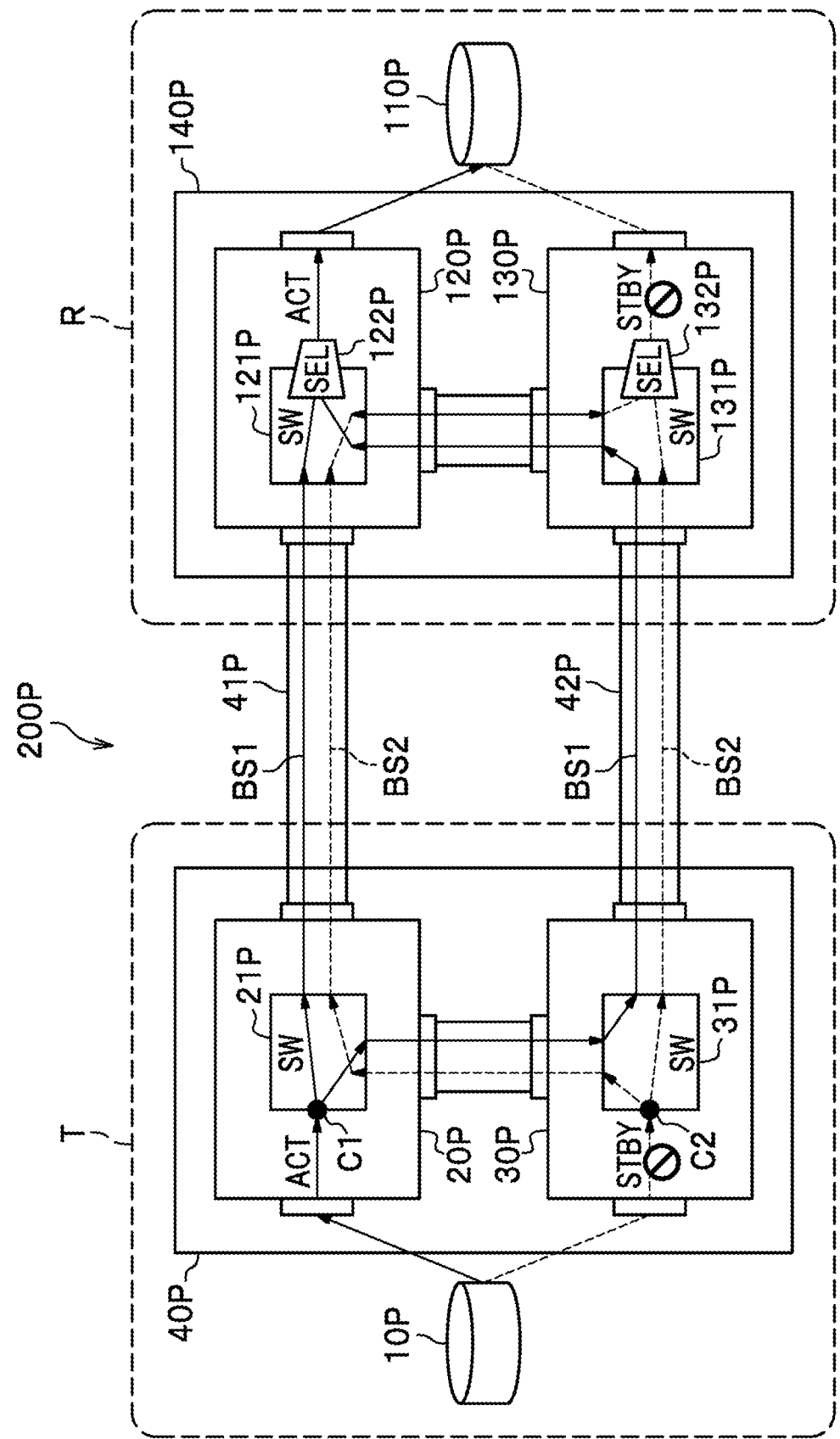
FIG. 12 is an explanatory diagram illustrating problems of the electrical multiplex transmission device to which the MC-LAG configuration is applied.

FIG. 12 is an explanatory diagram illustrating problems of the electrical multiplex transmission device to which the MC-LAG configuration is applied. In FIG. 12, the electrical multiplex transmission device illustrated in FIG. 11B will be described in detail. Note that the same components as those described above are denoted by the same reference numerals, and description thereof will be omitted as appropriate.

An electrical multiplex transmission device 200P illustrated in FIG. 12 includes a transmission base T and a reception base R. The transmission base T and the reception base R are connected along paths 41P and 42P. The transmission base T is a facility of a communication service provider in which the transmission side transmission device 40P is installed. The transmission base T is provided in an A building. On the other hand, the reception base R is a facility of a communication service provider in which the reception side transmission device 140P is installed. The reception base R is provided in a B building.

The transmission side transmission device 40P includes the first transmitter 20P and the second transmitter 30P. The first transmitter 20P includes the first switch 21P. The first switch 21P duplicates a signal input from the router 10P at the duplication point C1. The first switch 21P duplicates (copies) a first main signal in an electrical layer at the duplication point C1, for example. In this case, the first switch 21P transmits a signal input from the router 10P to the first receiver 120P via the path 41P, and outputs the duplicated signal duplicated at the duplication point C1 to the second switch 31P of the second transmitter 30P.

The second transmitter 30P includes a second switch 31P. The second switch 31P duplicates a signal input from the router 10P at a duplication point C2. The second switch 31P duplicates (copies) a second main signal in an electrical layer at the duplication point C2, for example. In this case, the second switch 31P transmits a signal input from the router 10P to the second receiver 130P via the path 42P, and outputs the duplicated signal duplicated at the duplication point C2 to the first switch 21P of the first transmitter 20P.

Here, a signal input to the first transmitter 20P from the router 10P is referred to as a first main signal, and the first main signal is referred to as a signal at the active time. A signal input to the second transmitter 30P from the router 10P is referred to as a second main signal, and the second main signal is referred to as a signal at the time of standby. Therefore, at the active time, the second main signal at the standby time is not input to the second transmitter 30P. Since the second main signal is a preliminary signal of the first main signal, the first main signal and the second main signal are the same.

On the other hand, the reception side transmission device 140P includes the first receiver 120P and the second receiver 130P.

The first receiver 120P includes the first switch 121P. The first switch 121P includes a first selector 122P.

The first selector 122P selects and outputs one of a signal input from the first transmitter 20P and a signal input from the second receiver 130P. The first receiver 120P outputs a signal received from the first transmitter 20P at the active time to configure an active side.

The second receiver 130P includes the second switch 131P. The second switch 131P includes a second selector 132P.

The second selector 132P selects and outputs one of a signal input from the second transmitter 30P and a signal input from the first receiver 120P. The second receiver 130P outputs a signal received from the second transmitter 30P at the standby time to configure a standby side.

In this case, each of the paths 41P and 42P needs to guarantee a path resource BS1 output from the first transmitter 20P and a path resource BS2 output from the second transmitter 30P. However, in traffic of the paths 41P and 42P, since only the path resource BS1 flows in the active state, the path resource BS2 constituting the standby side is useless.

Figure 1:
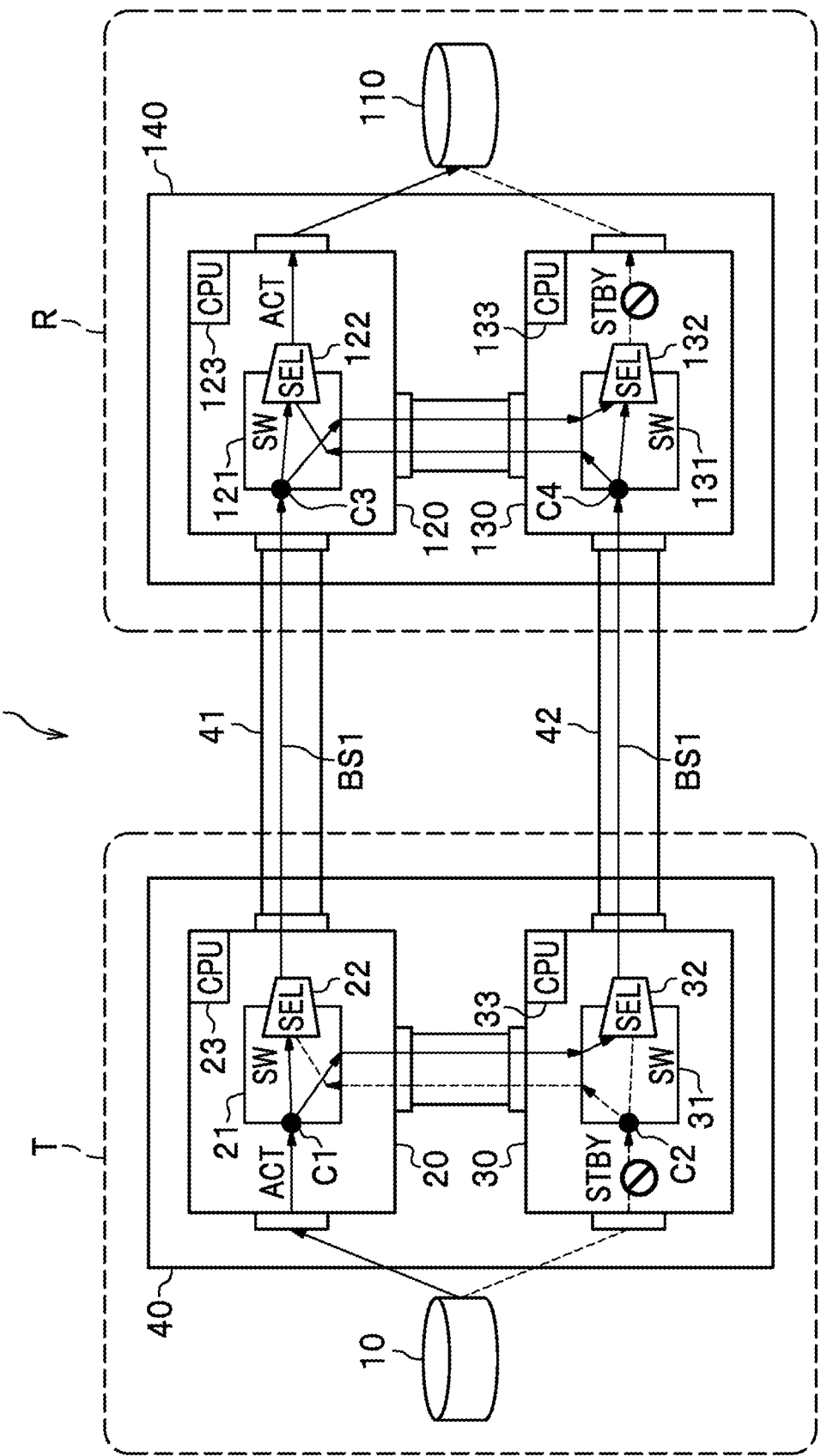
FIG. 1 is an explanatory diagram illustrating a configuration of a transmission device according to the present embodiment.

The present invention has been made in view of such circumstances, and as illustrated in FIG. 1 that will be described next, in the transmission side transmission device 40 and the reception side transmission device 140 between the box type electrical multiplex transmission devices, a selector function of selecting a signal is provided in the transmission side transmission device 40 which is the transmission side SW, and a copy function of copying a signal to the reception side transmission device 140 which is the reception side SW is provided.

Thus, the present invention can effectively utilize the path resources of the relay band while guaranteeing redundancy similar to the related art.

PRESENT EMBODIMENT

Hereinafter, a transmission device 200 including a transmission side transmission device and a reception side transmission device according to an embodiment of the present invention will be described with reference to the drawings.

FIG. 1 is an explanatory diagram illustrating a configuration of a transmission device 200 according to the present embodiment. The same components as those in the comparative example are denoted by the same reference numerals, and the description thereof will be omitted as appropriate.

As illustrated in FIG. 1, the transmission device 200 includes a transmission base T and a reception base R. The transmission base T and the reception base R are connected along paths 41 and 42. The transmission base T is a facility of a communication service provider in which the transmission side transmission device 40 is installed. The transmission base T is provided in an A building. On the other hand, the reception base R is a facility of a communication service provider in which the reception side transmission device 140 is installed. The reception base R is provided in a B building.

The transmission side transmission device 40 in the transmission base T and the reception side transmission device 140 in the reception base R are box type switches to which interfaces of switches are fixed. In the transmission device 200, the transmission side transmission device 40 and the reception side transmission device 140 configure path protection and guarantee a path resource of a relay band. Specifically, the path 41 configures path protection between the first transmitter 20 and the first receiver 120, and the path 42 configures path protection between the second transmitter 30 and the second receiver 130.

First, the transmission base T will be described. The transmission base T includes the router 10 and the transmission side transmission device 40. The router 10 is a device that relays exchange of data between a plurality of different networks.

The transmission side transmission device 40 includes the first transmitter 20 and the second transmitter 30. The first transmitter 20 includes a first switch 21 and a central processing unit (CPU) 23. The first switch 21 includes a first selector 22.

The first selector 22 selects and outputs one of the first main signal input from the router 10 and a duplicated signal of the second main signal input from the second transmitter. The first transmitter 20 outputs the signal selected by the first selector 22. Here, a signal input to the first transmitter 20 from the router 10 is a first main signal. Further, a signal input from the router 10 to the second transmitter 30 is referred to as a second main signal. In addition, the first main signal is referred to as a signal at the active time, and the second main signal is referred to as a signal at the standby time.

The first switch 21 duplicates the input first main signal at the duplication point C1. The first switch 21, for example, duplicates (copies) the first main signal in the electrical layer at the duplication point C1.

The CPU 23 controls an operation of the whole first transmitter 20, and controls selection of a signal of the first selector 22, for example, when a signal fault is detected in the first transmitter 20.

The second transmitter 30 includes a second switch 31 and a CPU 33. The second switch 31 includes a second selector 32.

The second selector 32 selects and outputs one of the input second main signal and the duplicated signal of the first main signal input from the first transmitter. The second transmitter 30 outputs the signal selected by the second selector 32.

The second switch 31 duplicates the input second main signal at the duplication point C2. The second switch 31 duplicates (copies) the second main signal in the electrical layer at the duplication point C2, for example.

The CPU 33 controls an operation of the whole second transmitter 30, and controls selection of the signal of the second selector 32, for example, when a signal fault is detected in the second transmitter 30.

In the present embodiment, when the first transmitter 20 detects a fault in the input first main signal, the second transmitter 30 duplicates the input second main signal and outputs a duplicated signal of the second main signal to the first transmitter 20. The first selector 22 of the first transmitter 20 selects and outputs the duplicated signal of the second main signal input from the second transmitter 30.

When the second transmitter 30 detects a signal fault in the first switch 21, the second selector 32 of the second transmitter 30 selects and outputs the input second main signal.

Next, the reception base R will be described. The reception base R includes a router 110 and a reception side transmission device 140. The router 110 is a device that relays exchange of data between a plurality of different networks.

The reception side transmission device 140 includes the first receiver 120 and the second receiver 130. The first receiver 120 includes the first switch 121 and a CPU 123. The first switch 121 includes a first selector 122.

The first selector 122 selects and outputs one of the first main signal (first reception signal) input from the first transmitter 20 and the duplicated signal of the second main signal (second reception signal) input from the second receiver 130. The first receiver 120 outputs the signal selected by the first selector 122. Here, the signal received by the first receiver 120 from the first transmitter 20 is referred to as a first reception signal, and the first reception signal is referred to as a signal at the active time. Further, the signal received by the second receiver 130 from the second transmitter 30 is referred to as a second reception signal, and the second reception signal is referred to as a signal at the standby time.

The first switch 121 duplicates the input first reception signal at a duplication point C3. The first switch 121 duplicates (copies) the first reception signal in an electrical layer at the duplication point C3, for example.

The CPU 123 controls an operation of the whole first receiver 120, and controls selection of the signal of the first selector 122, for example, when a signal fault is detected in the first receiver 120.

The second receiver 130 includes a second switch 131 and a CPU 133. The second switch 131 includes a second selector 132.

The second selector 132 selects and outputs one of the input second reception signal and the duplicated signal of the first reception signal input from the first receiver 120. The second receiver 130 outputs the signal selected by the second selector 132. At the standby time, the output of the second selector 132 is blocked.

The second switch 131 duplicates the input second reception signal at a duplication point C4. The second switch 131 duplicates (copies) the second reception signal in an electrical layer at the duplication point C4, for example.

The CPU 133 controls the overall operation of the second receiver 130, and controls the selection of the signal of the second selector 132, for example, when a signal fault is detected in the second receiver 130.

In the present embodiment, when the first receiver 120 detects a fault in the first reception signal input from the first transmitter 20, the second receiver 130 duplicates the second reception signal input from the second transmitter 30 and outputs a duplicated signal of the second reception signal to the first receiver 120. The first receiver 120 selects and outputs a duplicated signal of the second reception signal input from the second receiver 130 by the first selector 122.

When the second receiver 130 detects a fault in the first switch 121, the second selector 132 of the second receiver 130 selects and outputs the input second reception signal.

The first transmitter 20, the second transmitter 30, the first receiver 120, and the second receiver 130 respectively include the corresponding CPU 23, 33, 123, or 133, but the present invention is not limited thereto and is not particularly limited as long as each of the transmission side transmission device 40 and the reception side transmission device 140 includes a CPU and a signal fault can be detected.

Route Switching Sequence of Present Embodiment

Next, fault patterns in which each of the transmission side transmission device 40 and the reception side transmission device 140 executes path protection in the transmission device 200 according to the present embodiment will be described.

<<Overview of Route Switching Sequence>>

FIG. 2 is an explanatory diagram illustrating a fault portion in the transmission device 200 according to the present embodiment. FIG. 3 is an explanatory diagram illustrating an example in which the path of the main signal is switched for each fault pattern.

As illustrated in FIG. 2, ten fault patterns PT1 to PT10 in which a fault can occur in paths from the router 10 to the router 110 of the transmission device 200 are illustrated.

FIG. 3 illustrates switching of the path of the main signal for each fault portion in the ten fault patterns PT1 to PT10 corresponding to FIG. 2, and the fault patterns PT3, PT4, PT6, PT8, and PT9 among the ten fault patterns PT1 to PT10 do not need to switch the path of the signal even when a fault occurs in the signal.

On the other hand, in the fault patterns PT1, PT2, PT5, and PT7, a path through which the main signal passes is changed, and thus a switching sequence occurs. In the present embodiment, the fault pattern PT1 will be described as Example 1, the fault pattern PT2 will be described as Example 2, the fault pattern PT5 will be described as Example 3, and the fault pattern PT7 will be described as Example 4.

<Operation at Normal Time>

First, an operation at the normal time will be described. Initial setting states of the first selector 22 and the second selector 32 included in the first transmitter 20 and the second transmitter 30 will be described, and initial setting states of the first selector 122 and the second selector 132 included in the first receiver 120 and the second receiver 130 will be described.

Figure 4:
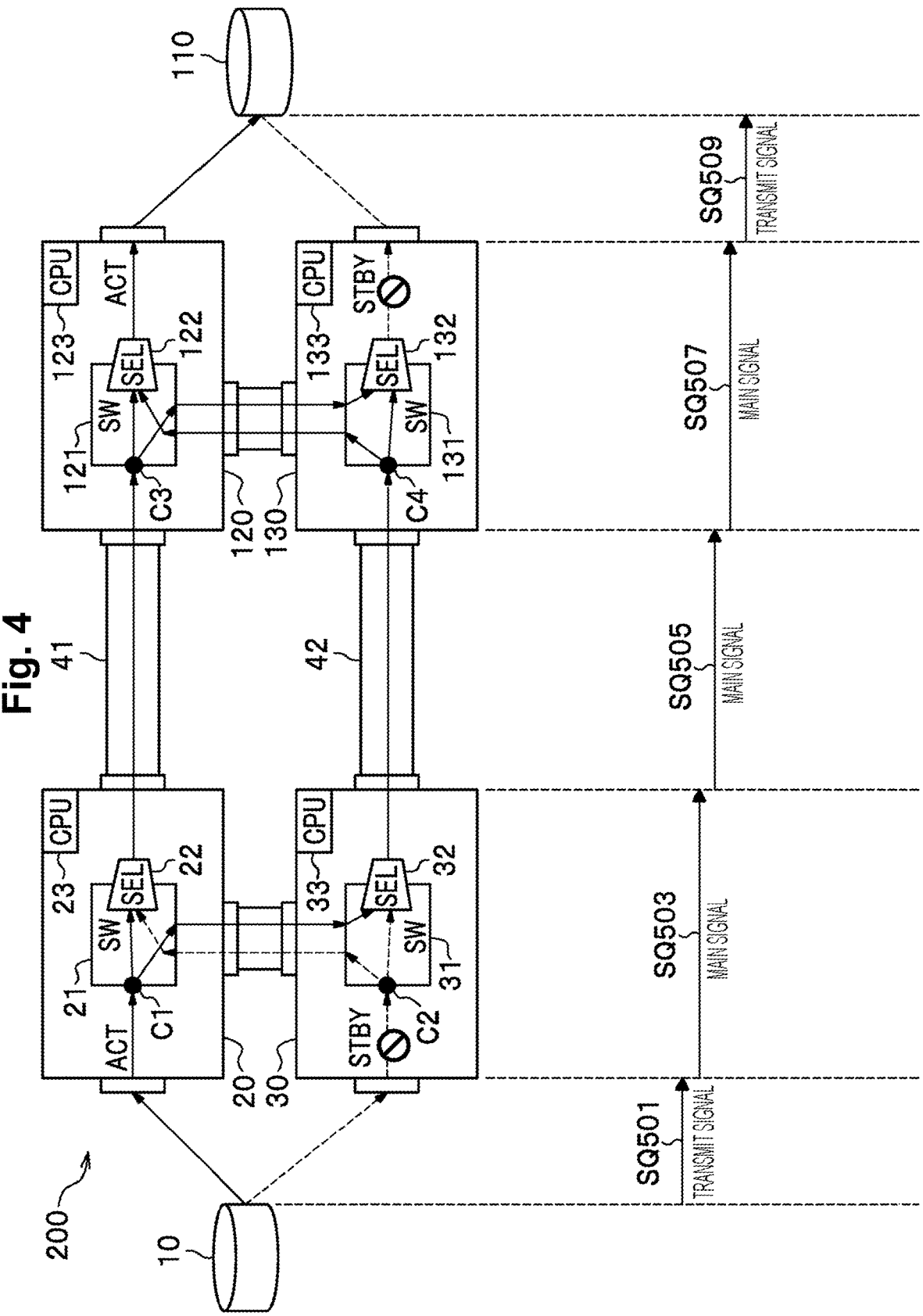
FIG. 4 is an explanatory diagram illustrating a state in which there is no fault portion and the transmission device according to the present embodiment is operating normally.

FIG. 4 is an explanatory diagram illustrating a state in which in the transmission device 200 according to the present embodiment is operating normally without a fault portion in the signal.

The transmission device 200 includes the router 10, the first transmitter 20, the second transmitter 30, the path 41, the path 42, the first receiver 120, the second receiver 130, and the router 110.

The router 10 is connected to the first transmitter 20 and the second transmitter 30 by the MC-LAG. The first transmitter 20 configures the active side, and the second transmitter 30 configures the standby side.

As illustrated in FIG. 4, the router 10 first transmits the first main signal to the first transmitter 20. On the other hand, since the second transmitter 30 configures the standby side, an input from the router 10 is blocked (SQ501).

The first switch 21 of the first transmitter 20 inputs the first main signal input from the router 10 to the first selector 22, duplicates the first main signal at the duplication point C1, and outputs a duplicated signal of the first main signal to the second selector 32 of the second transmitter 30. The first selector 22 of the first transmitter 20 selects and outputs the first main signal to the first receiver 120. On the other hand, the second selector 32 of the second transmitter 30 selects the duplicated signal of the first main signal input from the first switch 21 of the first transmitter 20, and outputs the duplicated signal to the second receiver 130 (SQ503).

The first main signal output from the first selector 22 is input to the first receiver 120 via the path 41. Further, the duplicated signal of the first main signal output from the second selector 32 is input to the second receiver 130 via the path 42 (SQ505).

The first switch 121 of the first receiver 120 inputs the first reception signal (the first main signal) input from the first transmitter 20 to the first selector 122, duplicates the first reception signal at the duplication point C3, and outputs a duplicated signal of the first reception signal to the second receiver 130.

The second switch 131 of the second receiver 130 inputs the second reception signal (the duplicated signal of the first main signal) input from the second transmitter 30 to the second selector 132, duplicates the second reception signal at the duplication point C4, and outputs the duplicated signal of the second reception signal to the first receiver 120.

The first selector 122 of the first receiver 120 selects and outputs the first reception signal at the active time. On the other hand, even when the second selector 132 of the second receiver 130 selects the duplicated signal of the first reception signal, an output is blocked because of the standby side (SQ507).

The first reception signal output from the first receiver 120 is transmitted to the router 110 (SQ509).

In this way, at the normal time, the first main signal transmitted from the router 10 is output from the first selector 122 of the first receiver 120 and is transmitted to the router 110.

Example 1

In Example 1, the fault pattern PT1 illustrated in FIGS. 2 and 3 will be described.

In Example 1 according to the present invention, when the first transmitter 20 detects a fault in the input first main signal, the second transmitter 30 duplicates the input second main signal and outputs a duplicated signal of the second main signal to the first transmitter 20. The first selector 22 of the first transmitter 20 selects and outputs the duplicated signal of the second main signal input from the second transmitter 30.

Figure 5:
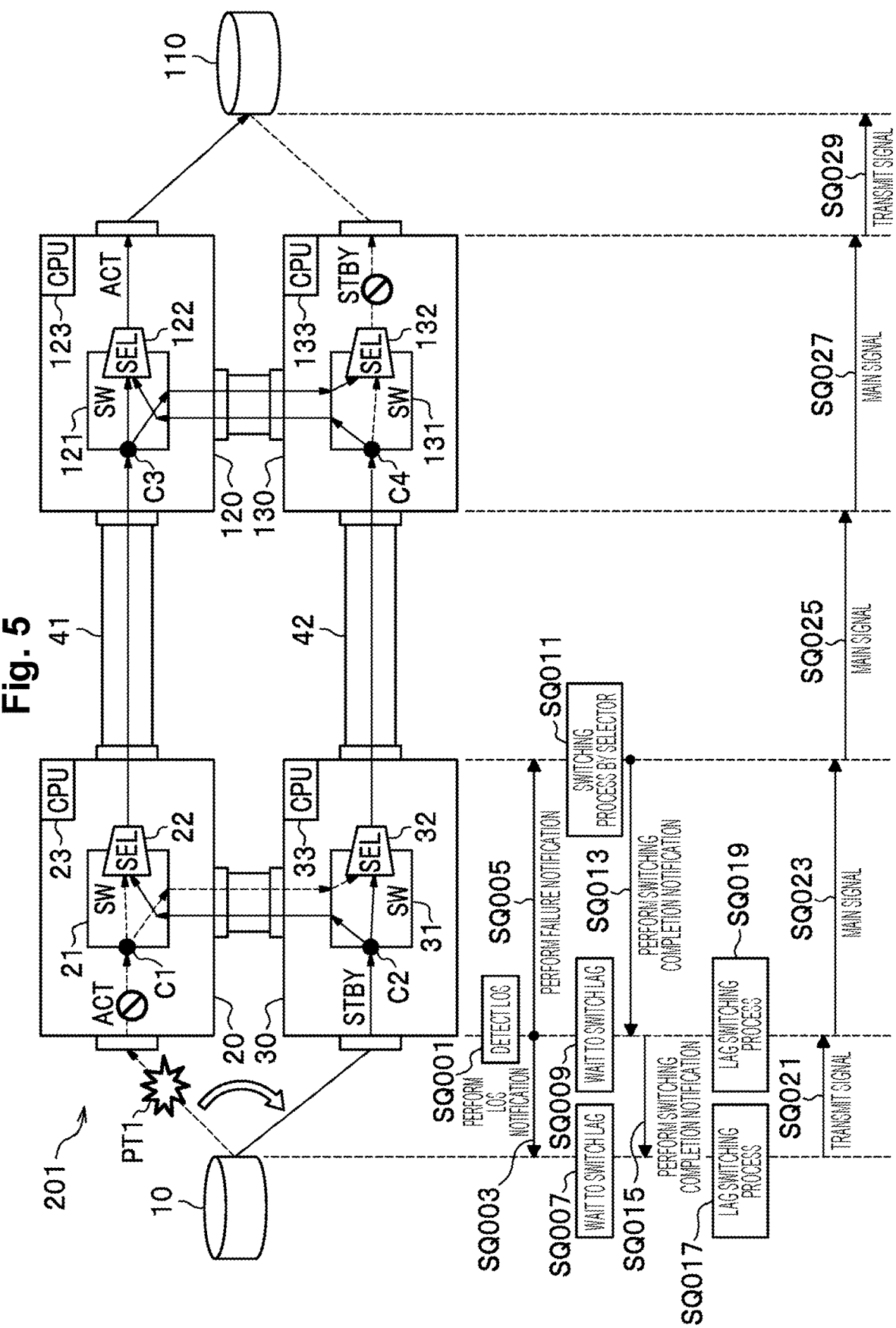
FIG. 5 is a sequence diagram illustrating a flow of a path switching process executed by first and second transmitters when a failure occurs between a router and the first transmitter in the transmission device according to the present embodiment.

FIG. 5 is a sequence diagram illustrating a flow of a path switching process (path protection) executed by the first transmitter 20 and the second transmitter 30 when a failure occurs between the router 10 and the first transmitter 20 in the transmission device 201 according to the present embodiment. Description of the same processes as those in FIG. 4 will be omitted as appropriate.

In Example 1, when a failure occurs between the router 10 and the first transmitter 20, switching between the first selector 22 of the first transmitter 20 and the second selector 32 of the second transmitter 30 is performed using a fault detection (that is, failure detection) as a trigger. A failure between the router 10 and the first transmitter 20 is determined with a signal fault received by the first transmitter 20. In this case, a failure between the router 10 and the first transmitter 20 can be detected by detecting a signal fault.

As illustrated in FIG. 5, when there is a fault in the signal between the router 10 and the first transmitter 20, the CPU 23 of the first transmitter 20 detects a loss of signal (LOS) (SQ001).

When the LOS of the first main signal is detected, the CPU 23 of the first transmitter 20 notifies the router 10 that there is a fault in accordance with the LOS notification (SQ003), and simultaneously performs a failure notification from the first transmitter 20 to the second transmitter 30 (SQ005).

When the LOS notification is received, router 10 waits to switch a signal transmitted by router 10 from the first main signal to the second main signal (SQ007). Similarly, the first transmitter 20 and the second transmitter 30 wait to switch a signal transmitted by the router 10 from the first main signal to the second main signal (SQ009).

On the other hand, the CPU 23 of the first transmitter 20 causes the first selector 22 to perform a switching process of switching the first main signal at the active time to the duplicated signal of the second main signal at the standby time, and the CPU 33 of the second transmitter 30 causes the second selector 32 to execute a switching process of switching the first main signal at the active time to the second main signal at the standby time (SQ011).

When the switching of the first selector 22 and the second selector 32 is completed, the CPU 23 of the first transmitter 20 and the CPU 33 of the second transmitter 30 perform a switching completion notification (SQ013 and SQ015), and the router 10, the first transmitter 20, and the second transmitter 30 performs a switching process of switching the first main signal at the active time to the second main signal at the standby time (SQ017 and SQ019).

When the switching process of switching the transmission signal to the second main signal is completed, the router 10 transmits the second main signal to the second transmitter 30 (SQ021).

When the second main signal is received, the CPU 33 of the second transmitter 30 duplicates the second main signal and outputs a duplicated signal of the second main signal to the first transmitter 20 (SQ023). The first selector 22 of the first transmitter 20 outputs the duplicated signal of the second main signal input from the second transmitter 30 to the first receiver 120 via the path 41 (SQ025).

The first receiver 120 inputs the input first reception signal (the duplicated signal of the second main signal) to the first switch 121 and the first selector 122 of the first receiver 120 selects and outputs the first reception signal (SQ027).

The first receiver 120 receives the input first reception signal, duplicates the input first reception signal at the duplication point C3, and transmits a duplicated signal of the first reception signal to the second receiver 130.

In this way, the first receiver 120 transmits the first reception signal to the router 110 (SQ029), and ends the path switching process for the fault pattern PT1.

Example 2

In Example 2, the fault pattern PT2 illustrated in FIGS. 2 and 3 will be described.

In Example 2 according to the present invention, when the first transmitter 20 detects a signal fault in the first switch 21, the second selector 32 of the second transmitter 30 selects and outputs the input second main signal.

Figure 6:
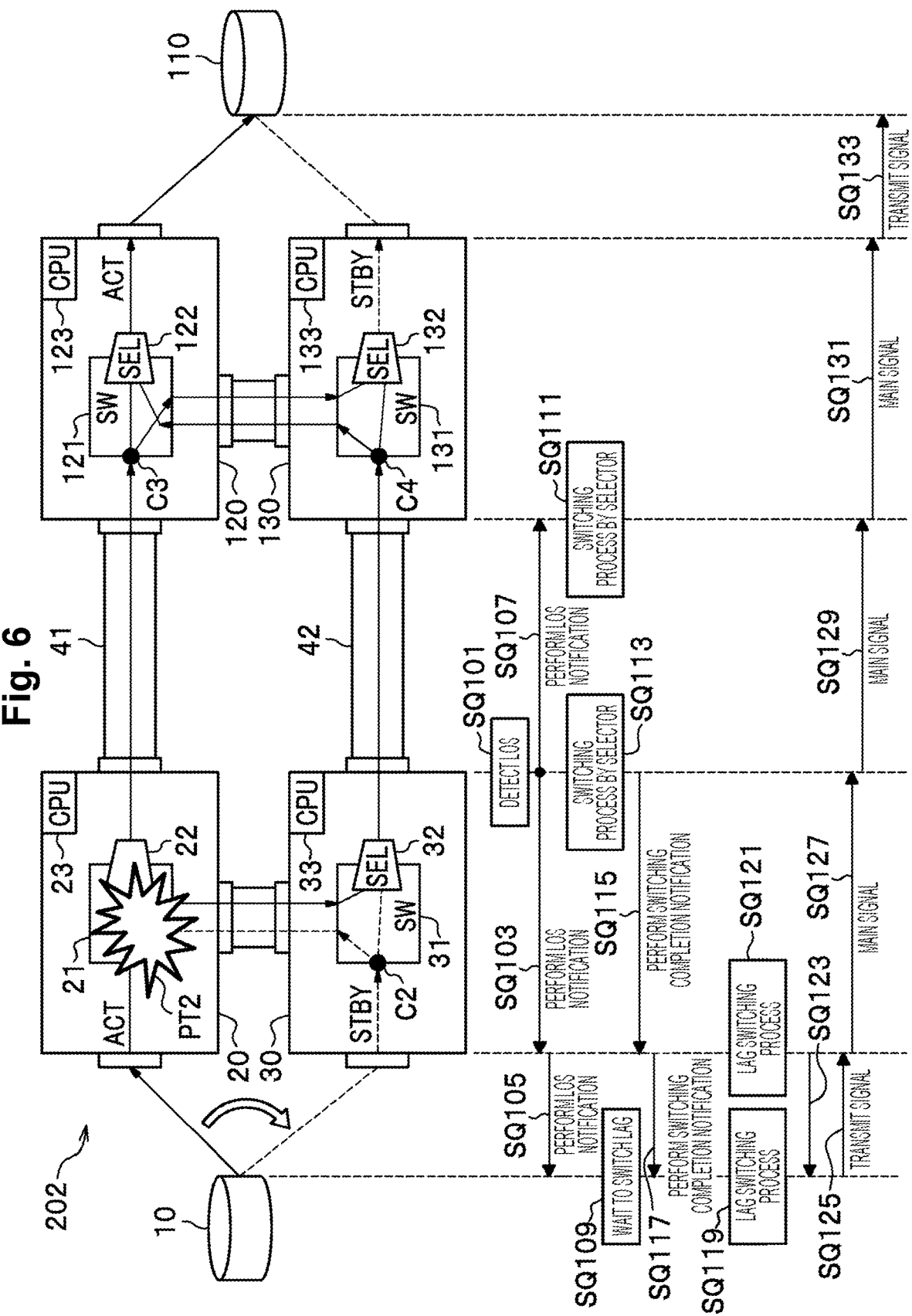
FIG. 6 is a sequence diagram illustrating a flow of a path switching process executed by the first and second transmitters when a fault occurs in the first transmitter in the transmission device according to the present embodiment.

FIG. 6 is a sequence diagram illustrating a flow of a path switching process performed by the first transmitter 20 and the second transmitter 30 when a fault occurs in the first transmitter 20 in the transmission device 202 according to the present embodiment. Description of the same processes as those in FIGS. 4 and 5 will be omitted as appropriate.

In Example 2, when a fault occurs in the first transmitter 20, path control is performed using fault detection in the own device (the transmission side transmission device 40) as a trigger.

As illustrated in FIG. 6, when there is a fault in the first transmitter 20, the CPU 33 of the second transmitter 30 detects the LOS (SQ101).

When the LOS is detected, the CPU 33 of the second transmitter 30 notifies the router 10 that the first transmitter 20 has been faulty by the LOS notification (SQ103 and SQ105), and at the same time, performs the LOS notification to the first receiver 120 (SQ107).

When the LOS notification is received, router 10 waits to switch the signal transmitted by router 10 from the first main signal to the second main signal (SQ109).

When the LOS notification is received from the second transmitter 30, the CPU 123 of the first receiver 120 causes the first selector 122 to perform the switching process of switching the selection in from the first reception signal to the duplicated signal of the second reception signal (SQ111).

The CPU 33 of the second transmitter 30 causes the second selector 32 to perform the switching process of switching the first main signal at the active time to the second main signal at the standby time (SQ113).

When the switching process is completed, the CPU 33 of the second transmitter 30 notifies the router 10 of the switching completion (SQ115 and SQ117), and the router 10 and the second transmitter 30 perform the switching process of switching the first main signal at the active time to the second main signal at the standby time (SQ119 and SQ121).

When the switching process of switching the first main signal to the second main signal at the time of standby is completed, the second transmitter 30 notifies that the switching process is completed (SQ123). The notification indicating the completion of the switching process is a process that can be arbitrarily provided in accordance with a difference in standard or specification.

When receiving the notification indicating the completion of the switching process is received from the second transmitter 30, the router 10 transmits the second main signal to the second transmitter 30 (SQ125).

The CPU 33 of the second transmitter 30 causes the second selector 32 to select and output the second main signal transmitted from the router 10 (SQ127). The second transmitter 30 transmits the second main signal to the second receiver 130 via the path 42 (SQ129).

The second receiver 130 receives the input second reception signal (the second main signal), duplicates the second reception signal at the duplication point C4, and outputs a duplicated signal of the second reception signal to the first receiver 120. The first selector 122 of the first receiver 120 outputs the duplicated signal of the second reception signal input from the second receiver 130 (SQ131).

In this way, the first receiver 120 transmits the duplicated signal of the second reception signal to the router 110 (SQ133), and ends the path switching process of the fault pattern PT2.

Example 3

In Example 3, the fault pattern PT5 illustrated in FIGS. 2 and 3 will be described.

In Example 3 according to the present invention, when the first receiver 120 detects a fault in the input first reception signal, the second receiver 130 duplicates the input second reception signal and outputs a duplicated signal of the second reception signal to the first receiver 120. The first receiver 120 selects and outputs a duplicated signal of the second reception signal input from the second receiver 130 by the first selector 122.

Figure 7:
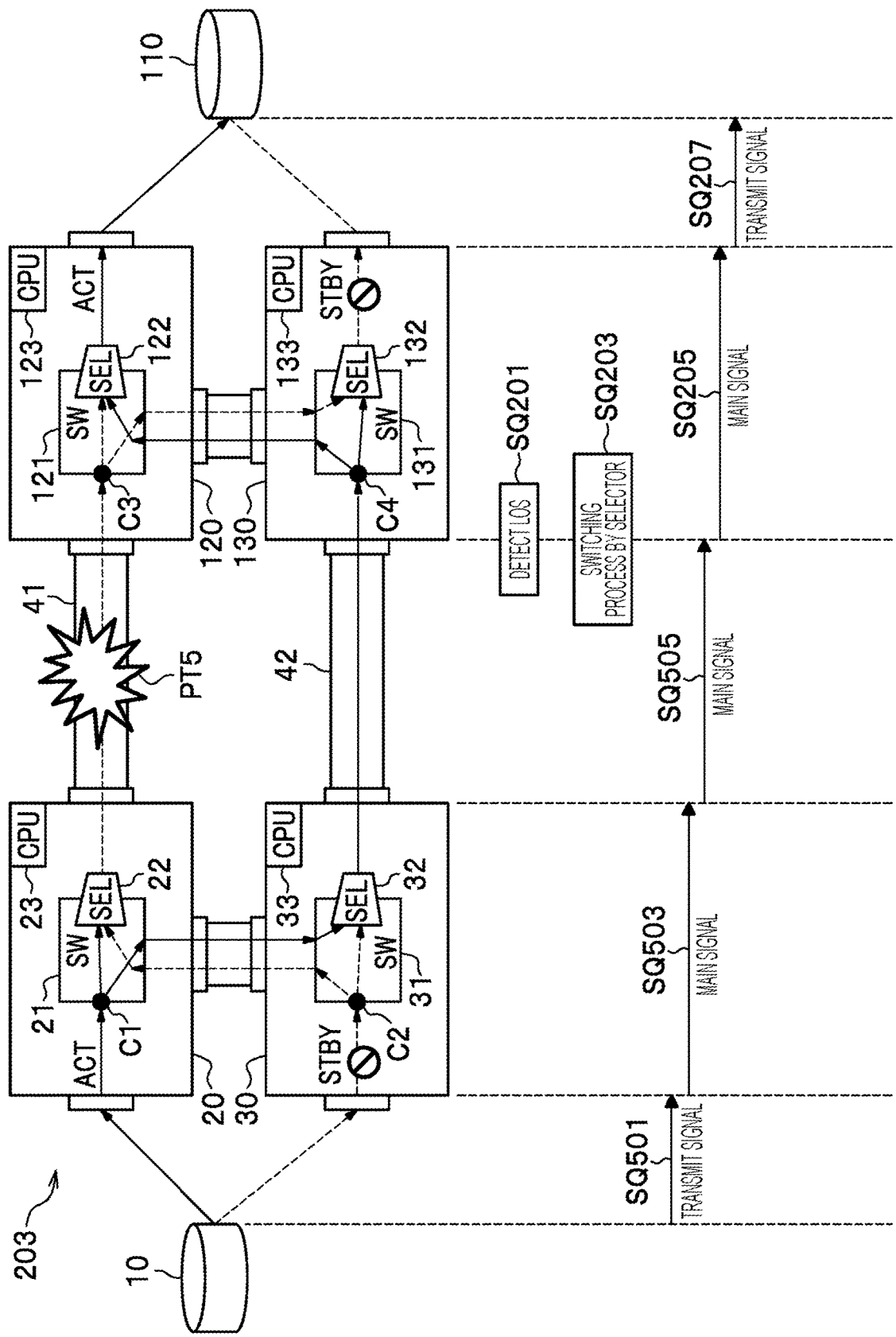
FIG. 7 is a sequence diagram illustrating a flow of a path switching process executed by first and second receivers when a failure occurs in a section between the first transmitter and the first receiver in the transmission device according to the present embodiment.

FIG. 7 is a sequence diagram illustrating a flow of a path switching process performed by the first receiver 120 and the second receiver 130 when a failure occurs in a section between the first transmitter 20 and the first receiver 120 in the transmission device 203 according to the present embodiment. Description of the same processes as those in FIGS. 4, 5, and 6 will be omitted as appropriate.

In Example 3, when a failure occurs in a section between the first transmitter 20 and the first receiver 120, the first selector 122 included in the first switch 121 of the first receiver 120 performs switching using fault detection (failure detection) of the first receiver 120 as a trigger.

At the normal time, the first transmitter 20 outputs the first main signal to the first receiver 120 and the second receiver 130 outputs the duplicated signal of the first main signal to the second receiver 130 (see SQ503 in FIG. 4).

When a failure occurs in the section between the first transmitter 20 and the first receiver 120, the first receiver 120 cannot receive the first main signal and performs fault detection (failure detection).

As illustrated in FIG. 7, when a failure occurs in the path 41 between the first transmitter 20 and the first receiver 120, the CPU 123 of the first receiver 120 detects the LOS from the received first main signal (SQ201).

In this case, the second receiver 130 receives the duplicated signal (the second reception signal) of the first main signal output from the second transmitter 30 via the path 42 (SQ505). The second switch 131 of the second receiver 130 further duplicates the duplicated signal of the first main signal at the duplication point C4 and outputs a signal in which the duplicated signal of the first main signal is further duplicated, that is, the duplicated signal of the second reception signal to the first receiver 120.

Thus, the CPU 123 of the first receiver 120 switches the output signal of the first selector 122 from the first reception signal (first main signal) to the duplicated signal of the second reception signal (SQ203).

The first switch 121 of the first receiver 120 outputs a duplicated signal of the second reception signal input from the second receiver 130 (SQ205). The first receiver 120 transmits the duplicated signal of the second reception signal output from the first switch 121 to the router 110 (SQ207).

In this way, the first receiver 120 transmits the duplicated signal of the second reception signal to the router 110, and ends the path switching process of the fault pattern PT5.

Example 4

In Example 4, the fault pattern PT7 illustrated in FIGS. 2 and 3 will be described.

In Example 4 according to the present invention, when the second receiver 130 detects a signal fault in the first switch 121 of the first receiver 120, the second selector 132 of the second receiver 130 selects and outputs the input second reception signal.

Figure 8:
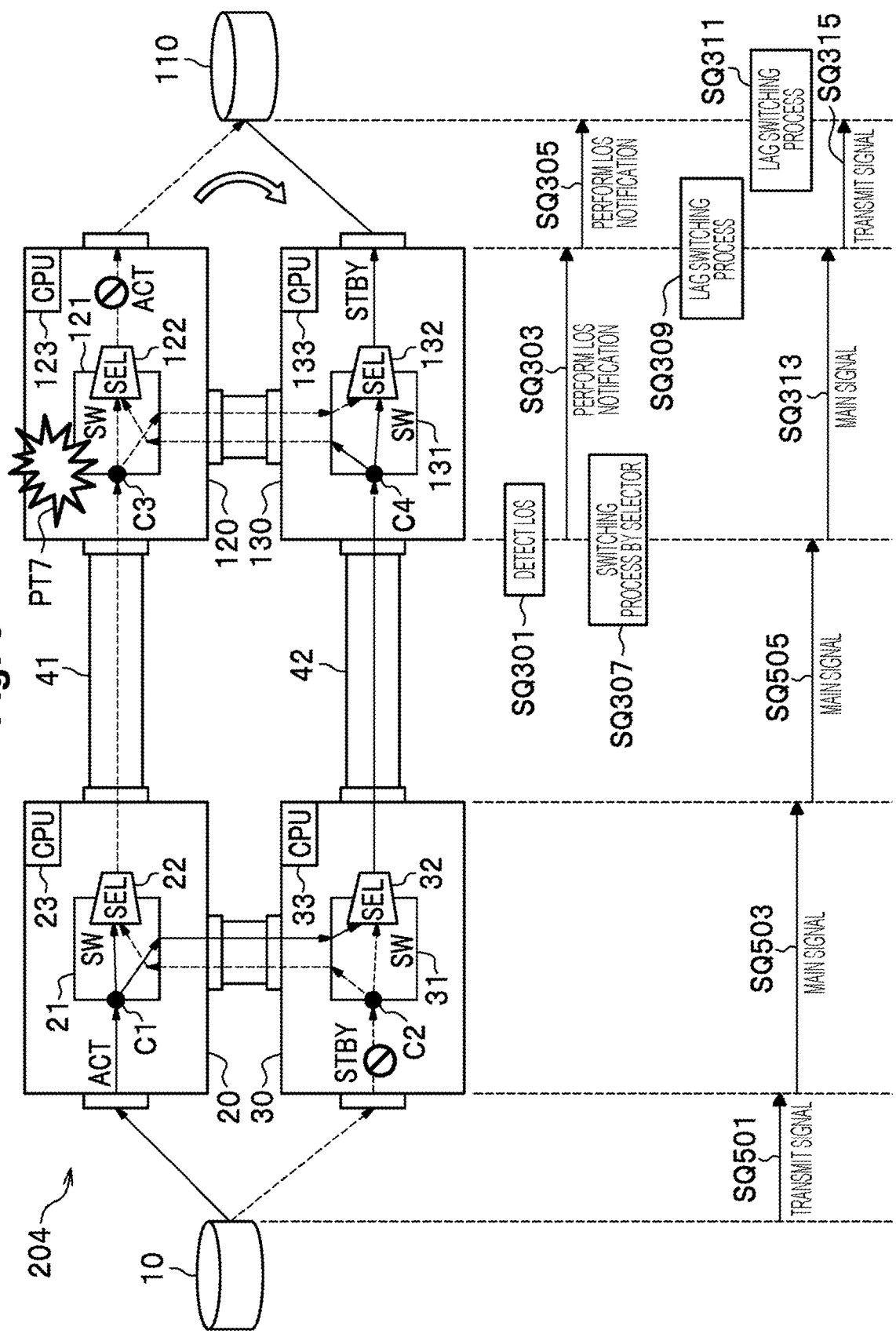
FIG. 8 is a sequence diagram illustrating a flow of a path switching process executed by a second receiver when a fault occurs in the first receiver in the transmission device according to the present embodiment.

FIG. 8 is a sequence diagram illustrating a flow of a path switching process performed by the second receiver 130 when a fault occurs in the first receiver 120 in the transmission device 204 according to the present embodiment. Description of the same processes as those in FIGS. 4, 5, 6, and 7 will be omitted as appropriate.

In Example 4, when a fault occurs in the first receiver 120, the second receiver 130 performs switching of the second selector 132 in the second receiver 130 using the fault detection of the first receiver 120 as a trigger.

At the normal time, the first receiver 120 receives the first reception signal (first main signal) input from the first transmitter 20 (see SQ505 in FIG. 4), and outputs a duplicated signal of the first reception signal to the second receiver 130 (see SQ507 in FIG. 4). The second receiver 130 receives the second reception signal (the duplicated signal of the first main signal) input from the second transmitter 30 (see SQ505 in FIG. 4) and outputs the duplicated signal of the second reception signal to the first receiver 120 (see SQ507 in FIG. 4).

When a fault occurs in the first receiver 120, the second receiver 130 performs fault detection from the duplicated signal of the first reception signal input from the first receiver 120.

As illustrated in FIG. 8, when there is a fault in the first receiver 120, the CPU 133 of the second receiver 130 detects the LOS from the duplicated signal of the first reception signal (SQ301). When the LOS is detected, the CPU 133 notifies the router 110 of the LOS (SQ303 and SQ305).

When the LOS is detected, the CPU 133 of the second receiver 130 causes the second selector 132 to perform the switching process of switching the selection from the duplicated signal of the first reception signal to the second reception signal (SQ307).

The CPU 133 of the second receiver 130 performs the switching process of switching the output signal to be transmitted to the router 110 from the first receiver 120 to the second receiver 130 (SQ309), and the router 110 performs a process of switching the signal received from the reception side transmission device 140 from the first receiver 120 to the second receiver 130 (SQ311).

When the switching process is completed, the second selector 132 of the second receiver 130 selects and outputs the second reception signal (SQ313). Then, the second receiver 130 transmits the second reception signal from the second selector 132 to the router 110 (SQ315).

<Hardware Configuration>

Figure 9:
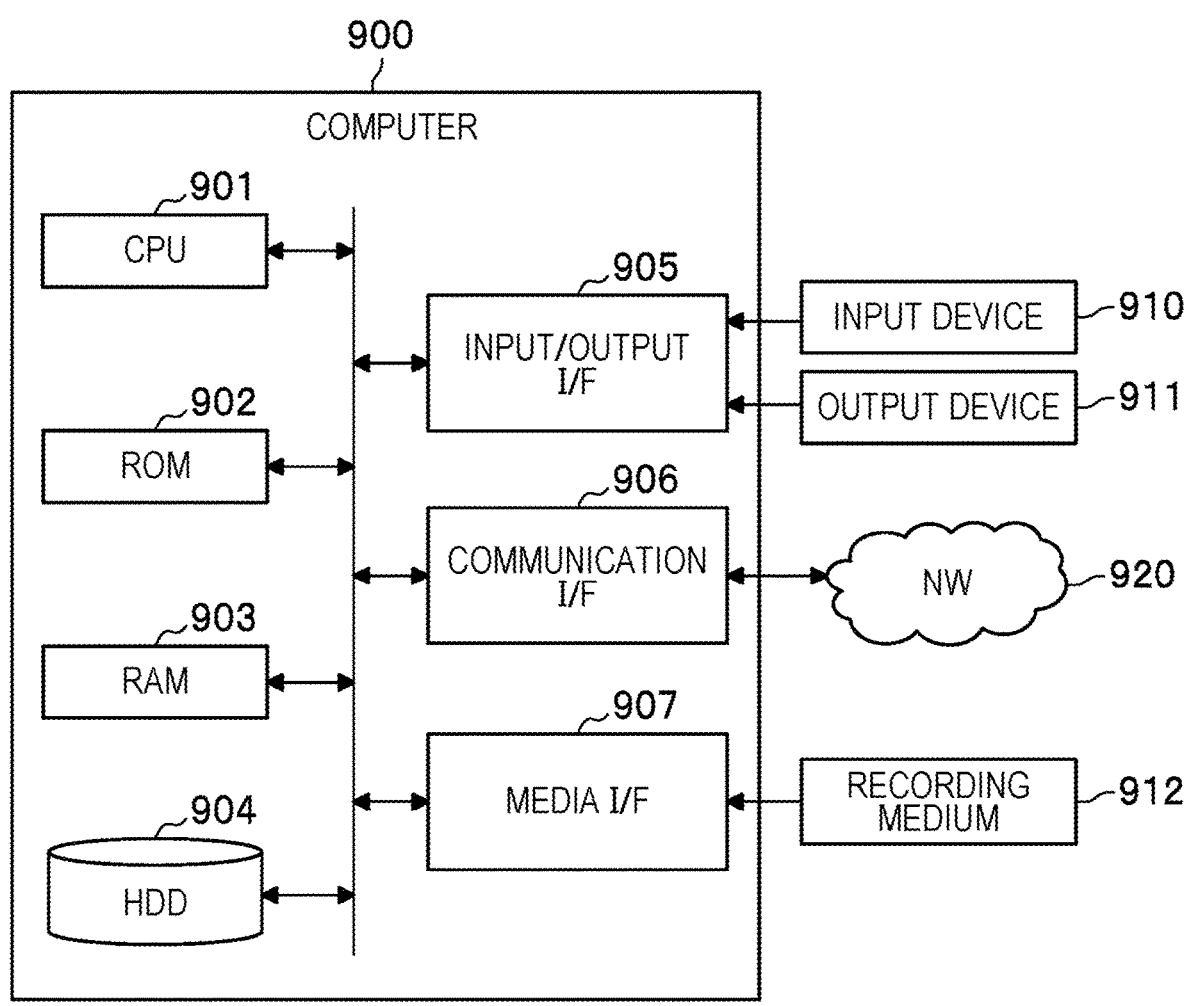
FIG. 9 is a diagram illustrating an example of a hardware configuration of a computer that implements functions of a transmission side transmission device and a reception side transmission device according to the present embodiment.

Control of the transmission side transmission device 40 and the reception side transmission device 140 according to the present embodiment is implemented by a computer 900 illustrated in FIG. 9, for example.

In this case, the computer 900 includes the first transmitter 20 including the first switch 21 and the second transmitter 30 including the second switch 31 (see FIG. 1), and thus is configured as the transmission side transmission device 40. The computer 900 includes the first receiver 120 including the first switch 121 and the second receiver 130 including the second switch 131 (see FIG. 1), and thus is configured as the reception side transmission device 140.

FIG. 9 is a diagram illustrating an example of a hardware configuration of a computer 900 that implements control of the transmission side transmission device 40 and the reception side transmission device 140 according to the present embodiment.

The computer 900 includes a central processing unit (CPU) 901, a read-only memory (ROM) 902, a RAM 903, a hard disk drive (HDD) 904, an input/output interface (I/F) 905, a communication I/F 906, and a media I/F 907.

The CPU 901 operates based on a program stored in the ROM 902 or the HDD 904, and realizes the control of the transmission side transmission device 40 and the reception side transmission device 140 illustrated in FIG. 1.

The ROM 902 stores a booting program executed by the CPU 901 at the time of starting the computer 900, a program related to hardware of the computer 900, and the like.

The CPU 901 controls an input device 910 such as a mouse and a keyboard and an output device 911 such as a display via the input/output I/F 905. Via the input/output I/F 905, the CPU 901 acquires data from the input device 910 and outputs generated data to the output device 911. As a processor, a GPU or the like may be used along with the CPU 901.

The HDD 904 stores a program executed by the CPU 901, data used by the program, and the like. The communication I/F 906 receives data from another device via a communication network (e.g., NW (network) 920) and outputs the data to the CPU 901, and transmits the data generated by the CPU 901 to another device via the communication network.

The media I/F 907 reads a program or data stored in a recording medium 912, and outputs the program or data to the CPU 901 via the RAM 903. The CPU 901 loads a program related to target processing from the recording medium 912 onto the RAM 903 via the media I/F 907, and executes the loaded program. The recording medium 912 is an optical recording medium such as a digital versatile disc (DVD) or a phase change rewritable disk (PD), a magneto-optical recording medium such as a magneto optical disk (MO), a magnetic recording medium, a conductor memory tape medium, a semiconductor memory, or the like.

For example, when the computer 900 functions as a part of the transmission side transmission device 40 according to the present embodiment, the CPU 901 of the computer 900 realizes the control of the transmission side transmission device 40 by executing a program loaded on the RAM 903. Note that the CPU 901 integrally controls the whole transmission side transmission device 40 with one CPU, but may be provided in each of the first transmitter 20 and the second transmitter 30 like the CPU 23 and the CPU 33 (see FIG. 1).

For example, when the computer 900 functions as a part of the reception side transmission device 140 according to the present embodiment, the CPU 901 of the computer 900 achieves the control of the reception side transmission device 140 by executing a program loaded on the RAM 903. Similarly, the CPU 901 integrally controls the whole reception side transmission device 140 by one CPU, but may be provided in each of the first receiver 120 and the second receiver 130 as the CPU 123 and the CPU 133 (see FIG. 1).

The HDD 904 stores data in the RAM 903. The CPU 901 reads a program related to target processing from the recording medium 912 and executes the program. Besides, the CPU 901 may read a program related to the target processing from another device via the communication network (NW 920).

<Effects>

Hereinafter, effects of the transmission side transmission device 40 according to the present embodiment will be described.

The transmission side transmission device 40 according to the present invention is a transmission side transmission device that includes the first transmitter 20 including the first switch 21; and the second transmitter 30 including the second switch 31. The first switch 21 of the first transmitter 20 includes the first selector 22 that selects and outputs one of an input first main signal and a duplicated signal of a second main signal input from the second transmitter 30. The second switch 31 of the second transmitter 30 includes the second selector 32 that selects and outputs one of an input second main signal and a duplicated signal of the first main signal input from the first transmitter 20. When the first transmitter 20 detects a fault in the input first main signal, the second transmitter 30 duplicates the input second main signal and outputs a duplicated signal of the second main signal to the first transmitter 20 and the first selector 22 of the first transmitter 20 selects and outputs the duplicated signal of the second main signal input from the second transmitter 30. When the second transmitter 30 detects a fault in the first switch 21, the second selector 32 of the second transmitter 30 selects and outputs the input second main signal.

Accordingly, when the first transmitter 20 detects a fault in the input first main signal, the second transmitter 30 duplicates the input second main signal, and outputs the duplicated signal of the second main signal to the first transmitter 20. The first selector 22 of the first transmitter 20 selects and outputs the duplicated signal of the second main signal input from the second transmitter 30.

When the second transmitter 30 detects a signal fault in the first switch 21, the second selector 32 of the second transmitter 30 selects and outputs the input second main signal.

As described above, according to the present embodiment, the transmission side transmission device 40 can effectively utilize the path resources of the relay band while guaranteeing redundancy similar to the related art.

Next, effects of the reception side transmission device 140 according to the present embodiment will be described.

The reception side transmission device 140 according to the present invention is a reception side transmission device that includes the first receiver 120 including the first switch 121; and the second receiver 130 including the second switch 131. The first switch 121 of the first receiver 120 includes the first selector 122 that selects and outputs one of an input first reception signal and a duplicated signal of a second reception signal input from the second receiver 130. The second switch 131 of the second receiver 130 includes the second selector 132 that selects and outputs one of the input second reception signal and a duplicated signal of the first reception signal input from the first receiver 120. When the first receiver 120 detects a fault in the input first reception signal, the second receiver 130 duplicates the input second reception signal and outputs a duplicated signal of the second reception signal to the first receiver 120 and the first selector 122 of the first receiver 120 selects and outputs a duplicated signal of the second reception signal input from the second receiver 130. When the second receiver 130 detects a signal fault in the first switch 121, the second selector 132 of the second receiver 130 selects and outputs the input second reception signal.

Thus, when the first receiver 120 detects a fault in the first reception signal input from the first transmitter 20, the second receiver 130 duplicates the second reception signal input from the second transmitter 30 and outputs the duplicated signal of the second reception signal to the first receiver 120. The first receiver 120 selects and outputs a duplicated signal of the second reception signal input from the second receiver 130 by the first selector 122.

When the second receiver 130 detects a fault in the first switch 121, the second selector 132 of the second receiver 130 selects and outputs the input second reception signal.

As described above, according to the present embodiment, the reception side transmission device 140 can effectively utilize the path resources of the relay band while guaranteeing redundancy similar to the related art.

Note that the present invention is not limited to the embodiment described above, and many modifications can be made by those who have ordinary knowledge in the art within the technical idea of the present invention.

REFERENCE SIGNS LIST 10, 110 Router
20 First transmitter
21 First switch
22 First selector
30 Second transmitter
31 Second switch
32 Second selector
40 Transmission side transmission device
120 First receiver
121 First switch
122 First selector
130 Second receiver
131 Second switch
132 Second selector
140 Reception side transmission device
200 Transmission device

The invention claimed is:

1. A transmission side transmission device comprising: a first transmitter including a first switch; and a second transmitter including a second switch,
wherein the first switch of the first transmitter includes a first selector configured to select and output one of an input first main signal and a duplicated signal of a second main signal input from the second transmitter,
wherein the second switch of the second transmitter includes a second selector configured to select and output one of an input second main signal and a duplicated signal of the first main signal input from the first transmitter, wherein, when the first transmitter detects a fault in the input first main signal, the second transmitter is configured to duplicate the input second main signal and output a duplicated signal of the second main signal to the first transmitter and the first selector of the first transmitter is configured to select and output the duplicated signal of the second main signal input from the second transmitter, and wherein, when the second transmitter detects a fault in the first switch, the second selector of the second transmitter is configured to select and output the input second main signal.

2. A reception side transmission device comprising: a first receiver including a first switch; and a second receiver including a second switch, wherein the first switch of the first receiver includes a first selector configured to select and output one of an input first reception signal and a duplicated signal of a second reception signal input from the second receiver, wherein the second switch of the second receiver includes a second selector configured to select and output one of the input second reception signal and a duplicated signal of the first reception signal input from the first receiver, wherein, when the first receiver detects a fault in the input first reception signal, the second receiver is configured to duplicate the input second reception signal and output a duplicated signal of the second reception signal to the first receiver and the first selector of the first receiver is configured to select and output a duplicated signal of the second reception signal input from the second receiver, and wherein, when the second receiver detects a signal fault in the first switch, the second selector of the second receiver is configured to select and output the input second reception signal.

3. A redundancy method for a transmission side transmission device that includes a first transmitter including a first switch and a second transmitter including a second switch, wherein the first switch of the first transmitter includes a first selector configured to select and output one of an input first main signal and a duplicated signal of a second main signal input from the second transmitter, wherein the second switch of the second transmitter includes a second selector configured to select and output one of an input second main signal and a duplicated signal of the first main signal input from the first transmitter, wherein, when the first transmitter detects a fault in the input first main signal, the second transmitter of the transmission side transmission device is configured to perform duplicating the input second main signal and outputting a duplicated signal of the second main signal to the first transmitter, and the first selector of the first transmitter is configured to perform selecting and outputting the duplicated signal of the second main signal input from the second transmitter, and wherein, when the second transmitter detects a fault in the first switch, the second selector of the second transmitter is configured to perform selecting and outputting the input second main signal.

4. The reception side transmission device according to claim 2, comprising the first receiver connected to a first transmitter and the second receiver connected to a second transmitter.

* * * * *